United States Patent
Draak

(10) Patent No.: US 11,742,701 B2
(45) Date of Patent: Aug. 29, 2023

(54) DEVICE AND METHOD FOR WIRELESS POWER TRANSFER AND IMPROVED FOREIGN OBJECT DETECTION

(71) Applicant: KONINKLIJKE PHILIPS N.V., Eindhoven (NL)

(72) Inventor: Johannes Wilhelmus Draak, Limburg (NL)

(73) Assignee: Koninklijke Philips N.V., Eindhoven (NL)

( * ) Notice: Subject to any disclaimer, the term of this patent is extended or adjusted under 35 U.S.C. 154(b) by 148 days.

(21) Appl. No.: 17/437,857

(22) PCT Filed: Feb. 14, 2020

(86) PCT No.: PCT/EP2020/053994
§ 371 (c)(1),
(2) Date: Sep. 10, 2021

(87) PCT Pub. No.: WO2020/187507
PCT Pub. Date: Sep. 24, 2020

(65) Prior Publication Data
US 2022/0173624 A1      Jun. 2, 2022

(30) Foreign Application Priority Data
Mar. 19, 2019   (EP) .................................. 19163757

(51) Int. Cl.
*H02J 50/60*   (2016.01)
*H02J 50/10*   (2016.01)
*H02J 50/70*   (2016.01)

(52) U.S. Cl.
CPC .............. *H02J 50/60* (2016.02); *H02J 50/10* (2016.02); *H02J 50/70* (2016.02)

(58) Field of Classification Search
CPC .............. H01F 27/288; H01F 27/2885; H01F 27/36–366; H02J 50/10; H02J 50/12; H02J 50/60; H02J 50/70
(Continued)

(56) References Cited

U.S. PATENT DOCUMENTS

| 2012/0112552 A1 | 5/2012 | Baarman | |
| 2014/0292101 A1* | 10/2014 | Baarman | H02J 50/12 307/104 |

(Continued)

FOREIGN PATENT DOCUMENTS

| EP | 2950418 A1 | 12/2015 |
| WO | 20120127335 A1 | 9/2012 |

(Continued)

OTHER PUBLICATIONS

Qi Specification Feb. 2018.
International Search Report and Written Opinion From PCT/EP2020/053994 dated Sep. 24, 2020.

*Primary Examiner* — Levi Gannon

(57) ABSTRACT

A wireless power transmitter (101) or power receiver (105) comprises a power transfer coil (103, 107) for receiving or generating a power transfer signal and a controller (201, 301) for controlling the device to perform power transfer during a power transfer phase. The power transfer phase comprises power transfer intervals where power is transferred and foreign object detection time intervals during which a power level of the power transfer signal is reduced. A magnetic shielding element (503, 505) is positioned between the power transfer coil (103, 107) and a power transfer coil of a complementary device. The magnetic shielding element (503, 505) comprises a magnetic shield material having a saturation point such that it operates in a saturated and non-saturated mode during respectively power transfer intervals and foreign object detection time intervals.

(Continued)

The saturation point is above a magnetic field strength generated by the power transfer signal during the power transfer time intervals and below that generated during the foreign object detection time intervals.

20 Claims, 14 Drawing Sheets

(58) Field of Classification Search
USPC .......................................................... 307/104
See application file for complete search history.

(56) References Cited

U.S. PATENT DOCUMENTS

| | | | |
|---|---|---|---|
| 2015/0097442 A1* | 4/2015 | Muurinen | H02J 7/00034 |
| | | | 307/104 |
| 2018/0069435 A1* | 3/2018 | Sakata | H02J 50/60 |
| 2018/0166928 A1 | 6/2018 | Wu et al. | |

FOREIGN PATENT DOCUMENTS

| WO | 20140148312 A1 | 9/2014 |
|---|---|---|
| WO | 2015018868 A1 | 2/2015 |

* cited by examiner

DEVICE AND METHOD FOR WIRELESS POWER TRANSFER AND IMPROVED FOREIGN OBJECT DETECTION

CROSS-REFERENCE TO PRIOR APPLICATIONS

This application is the U.S. National Phase application under 35 U.S.C. § 371 of International Application No. PCT/EP2020/053994, filed on Feb. 14, 2020, which claims the benefit of EP Patent Application No. EP 19163757.8, filed on Mar. 19, 2019. These applications are hereby incorporated by reference herein.

FIELD OF THE INVENTION

The invention relates to wireless power transfer system and in particular, but not exclusively, to a device and method for supporting high power wireless power transfer, such as for example for supporting kitchen appliances.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

In power transfer systems, such as Qi, the electromagnetic field generated to transfer the required levels of power to the power receiver is often very substantial. The presence of such a strong field may in many situations have an impact on the surroundings. For example, a potential problem with wireless power transfer is that power may unintentionally be transferred to e.g. metallic objects that happen to be in the vicinity of the power transmitter.

For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may be highly disadvantageous.

In order to reduce the risk of such situations arising, it has been proposed to introduce foreign object detection where the power transmitter can detect the presence of a foreign object and reduce the transmit power and/or generate a user alert when a positive detection occurs. For example, the Qi system includes functionality for detecting a foreign object, and for reducing power if a foreign object is detected. Specifically, Qi specification version 1.2.1, section 11 describes various methods of detecting a foreign object.

One method to detect such foreign objects is disclosed in WO2015018868A1. Another example is provided in WO 2012127335 which discloses an approach based on determining unknown power losses. In the approach, both the power receiver and the power transmitter measure their power, and the receiver communicates its measured received power to the power transmitter. When the power transmitter detects a significant difference between the power sent by the transmitter and the power received by the receiver, an unwanted foreign object may potentially be present, and the power transfer may be restricted or aborted for safety reasons.

In the Qi power transfer standard, the power receiver estimates its received power e.g. by measuring the rectified voltage and current, multiplying them and adding an estimate of the internal power losses in the power receiver (e.g. losses of the rectifier, the receiver coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them and correcting the result by subtracting an estimation of the internal power losses in the transmitter, such as e.g. the estimated power loss in the inverter, the primary coil, and metal parts that are part of the power transmitter.

The power transmitter can estimate the power loss by subtracting the reported received power from the transmitted power. If the difference exceeds a threshold, the transmitter will assume that too much power is dissipated in a foreign object, and it can then proceed to terminate the power transfer. However, in practice it has been found that the approach is less accurate than desired and especially the error and uncertainties of estimating the impact of the internal power losses in the power transmitter and the power receiver may cause suboptimal performance.

Alternatively, it has been proposed to measure the quality or Q-factor of the resonant circuit formed by the primary and secondary coils together with the corresponding capacitances and resistances. A reduction in the measured Q-factor may be indicative of a foreign object being present.

In practice, it tends to be difficult to achieve sufficient detection accuracy using the methods described in the Qi specification. This difficulty is exacerbated by a number of uncertainties about the specific current operating conditions.

For example, a particular problem is the potential presence of friendly metals (i.e. metal parts of the device that embodies the power receiver or the power transmitter) as the magnetic and electrical properties of these may be unknown (and vary between different devices) and therefore may be difficult to compensate for.

Further, undesirable heating may result from even relatively small amounts of power being dissipated in a metallic foreign object. Therefore, it is necessary to detect even a small power discrepancy between the transmitted and received power, and this may be particularly difficult when the power levels of the power transfer increase.

The Q factor degradation approach may in many scenarios have a better sensitivity for detecting the presence of metal objects. However, it may still not provide sufficient accuracy and e.g. may also suffer from the influence of friendly metal.

Accordingly, current algorithms tend to be suboptimal and may in some scenarios and examples provide less than optimum performance. In particular, they may result in the presence of foreign objects not being detected, or in false detections of foreign objects when none are present.

The difficulties of accurate foreign object detection are particularly difficult in scenarios where the power level of the power transfer signal is high and/or when it varies. Thus, foreign object detection is particularly difficult during the power transfer phase.

Hence, an improved operation for a power transfer system would be advantageous, and in particular, an approach allowing increased flexibility, reduced cost, reduced complexity, improved foreign object detection, reduced sensitivity to variations in properties of power receiver or power transmitter devices, improved adaptability, improved backwards compatibility, and/or improved performance would be advantageous. In particular, an approach providing an improved electromagnetic environment for detection of foreign object would be advantageous.

SUMMARY OF THE INVENTION

Accordingly, the Invention seeks to preferably mitigate, alleviate or eliminate one or more of the above mentioned disadvantages singly or in any combination.

Accordingly, the Invention seeks to preferably mitigate, alleviate or eliminate one or more of the above mentioned disadvantages singly or in any combination.

According to an aspect of the invention there is provided device for wireless power transfer from a power transmitter to a power receiver using an electromagnetic power transfer signal, the device being one of the power transmitter and the power receiver, the device comprising: a power transfer coil for receiving or generating the power transfer signal; a controller for controlling the device to perform power transfer during a power transfer phase, the power transfer phase comprising power transfer intervals where power is transferred and foreign object detection time intervals during which a power level of the power transfer signal is reduced; a magnetic shielding element positioned between the power transfer coil and a power transfer coil of a complementary device during power transfer operation, the complementary device being the other device of the power receiver and the power transmitter; wherein the magnetic shielding element comprises a magnetic shield material having a saturation point such that it operates in a saturated mode during power transfer intervals and in a non-saturated mode during foreign object detection time intervals, the saturation point being above a magnetic field strength generated by the power transfer signal during the power transfer time intervals and below a magnetic field strength generated during the foreign object detection time intervals.

The invention may provide improved performance in many scenarios. It may in many embodiments allow tight coupling between power transfer coils while allowing effective and advantageous foreign object detection. The approach may in many embodiments provide improved foreign object detection and/or improved power transfer. The approach may reduce or mitigate the impact of the power transfer coil on the foreign object detection. The approach may achieve a separation between the foreign object detection antenna and the power transfer coil during foreign object detection without introducing an unacceptable degradation of the power transfer. In many embodiments, the impact of the power transfer coil on the foreign object detection may be substantially reduced while only a negligible effect on power transfer is introduced.

The approach may in many scenarios provide an electromagnetic environment that exhibits improved suitability for foreign object detection, and specifically may provide an electromagnetic environment in which the electromagnetic effect of a foreign object is more significant and easier to detect.

The magnetic shielding element may be arranged to operate in a saturated mode during power transfer intervals and in a non-saturated mode during foreign object detection time intervals by having a saturation point corresponding to a magnetic field strength higher than generated by foreign object detection antenna during the foreign object detection time intervals and lower than generated by the power transfer coil during the power transfer time intervals. The saturation point may be for a magnetic field strength higher than a maximum field strength generated in the magnetic shielding element during foreign object detection time intervals but lower than a (minimum) field strength generated in the magnetic shielding element during power transfer time intervals. In many embodiments, the operation is achieved by designing a magnetic shielding element to have a saturation point in the range from 100 mT to 1 T, and often in the range from 200 mT to 400 mT.

A saturation point for the magnetic shielding element may be a field strength in the magnetic shielding element for which the permeability is reduced to $\frac{1}{10}^{th}$ of the permeability for a magnetic field strength of 0 T.

The magnetic shield material may typically be considered saturated if the field strength is above the saturation point and not saturated if the field strength is below the saturation point.

The foreign object detection antenna may overlap the power coil such that at least part of the foreign object detection antenna is between the power transfer coil of the device and the power transfer coil of the complementary device for a nominal/optimal spatial position of the two devices for power transfer. The power transfer coil may have a central axis, and may specifically have a substantially planar arrangement in a plane perpendicular to the axis. The foreign object detection antenna may overlap the power coil such that at least part of the foreign object detection antenna falls within a 3D figure formed by translating an area of power transfer coil in the direction of the axis (the 3D figure may be considered to have a constant cross section corresponding to the area of the power transfer coil and to extend along the axis).

The power transfer intervals and foreign object detection time intervals are typically non-overlapping.

The power transfer coil and the foreign object detection antenna are typically arranged such that the foreign object detection antenna is closer than the power transfer coil to a surface through which power transfer takes place. The arrangement is typically such that the foreign object detection antenna is positioned between the power transfer coil and a complementary power transfer coil of the complementary device during power transfer operation. The foreign object detection antenna may be positioned between the power transfer coil and a surface of the device for coupling to the complementary device.

In some embodiments, the foreign object detection antenna is a planar antenna having an area of no less than 30 cm$^2$.

In some embodiments, an area of the power transfer coil is no less than 50 cm$^2$.

In some embodiments, the foreign object detection antenna and the power transfer coil are planar coils.

In some embodiments, the foreign object detection antenna and the power transfer coil are co-axial.

In some embodiments, the power transfer intervals and the foreign object detection time intervals are disjoint.

In some embodiments, the saturation point corresponds to a magnetic field strength higher than generated by the foreign object detection antenna during the foreign object detection time intervals and lower than generated by the power transfer coil during the power transfer time intervals.

In some embodiments, the device further comprises a foreign object detection antenna, and a foreign object detector arranged to generate a drive signal to drive the foreign object detection antenna to generate a foreign object detection electromagnetic test signal during the foreign object detection time intervals and perform foreign object detection in response to the drive signal.

In accordance with an optional feature of the invention, the magnetic shielding element is a sheet element having a thickness not exceeding 1 mm.

This may in many embodiments provide an efficient shielding effect yet allow compact dimensions and high coupling factors to be achieved.

In some embodiments, the sheet element may have a thickness not exceeding 0.5 mm, 2 mm, or 5 mm.

In accordance with an optional feature of the invention, the magnetic shield material is a ferrite material.

This may provide particularly advantageous operation and performance in many embodiments.

In accordance with an optional feature of the invention, the device is the power receiver and the complementary device is the power transmitter.

The approach may provide an improved power receiver in many embodiments.

In accordance with an optional feature of the invention, the device is the power transmitter and the complementary device is the power receiver.

The approach may provide an improved power transmitter in many embodiments.

In accordance with an optional feature of the invention, the device further comprises a foreign object detection antenna; and a foreign object detector arranged to generate a drive signal to drive the foreign object detection antenna to generate a foreign object detection electromagnetic test signal during the foreign object detection time intervals and perform foreign object detection in response to the drive signal; and where the magnetic shielding element is positioned between the power transfer coil and the foreign object detection antenna.

This may provide particularly advantageous operation and performance in many embodiments.

In accordance with an optional feature of the invention, the foreign object detector is arranged to generate the drive signal to restrict an electromagnetic field strength of the foreign object detection electromagnetic test signal in the magnetic shielding element to be below the saturation point.

This may provide particularly advantageous operation and performance in many embodiments.

In accordance with an optional feature of the invention, the foreign object detection antenna overlaps the power transfer coil.

In accordance with an optional feature of the invention, a saturation point for the magnetic shield element is in a range from 100 mT to 1 T.

This may provide particularly efficient operation in many embodiments and may specifically in many embodiments mean that the magnetic shield material is arranged to operate in a saturated mode during power transfer intervals and in a non-saturated mode during foreign object detection time intervals.

In accordance with an optional feature of the invention, a saturation point for the magnetic shield element is in a range from 200 mT to 400 mT.

This may provide particularly efficient operation in many embodiments and may specifically in many embodiments mean that the magnetic shield material is arranged to operate in a saturated mode during power transfer intervals and in a non-saturated mode during foreign object detection time intervals.

According to an aspect of the invention there is provided a wireless power transfer system for performing wireless power transfer from a power transmitter to a power receiver using an electromagnetic power transfer signal, the wireless power transfer system comprising: a first power transfer coil of the power transmitter for generating the power transfer signal; a second power transfer coil of the power receiver for receiving the power transfer signal; a controller for controlling the power transfer system to perform power transfer during a power transfer phase, the power transfer phase comprising power transfer intervals where power is transferred and foreign object detection time intervals during which a power level of the power transfer signal is reduced; a magnetic shielding element positioned between the first power transfer coil and the second power transfer coil during power transfer operation; wherein the magnetic shielding element comprises a magnetic shield material having a saturation point such that it operates in a saturated mode during power transfer intervals and in a non-saturated mode during foreign object detection time intervals, the saturation point being above a magnetic field strength generated by the power transfer signal during the power transfer time intervals and below a magnetic field strength generated during the foreign object detection time intervals.

In accordance with an optional feature of the invention, at least one of the power transmitter and the power receiver comprises a first foreign object test antenna for generating a foreign object detection electromagnetic test signal during the foreign object detection time intervals; and the wireless power transfer system further comprises a foreign object detector arranged to perform foreign object detection in response to a measurement of the foreign object detection electromagnetic test signal.

In accordance with an optional feature of the invention, the measurement is a measurement of a parameter of a drive signal for the foreign object test antenna.

In accordance with an optional feature of the invention, the wireless power system further comprises a foreign object detection antenna and the wherein the measurement is of a signal induced in the foreign object detection antenna during the foreign object detection time intervals, the foreign object test antenna and the foreign object detection antenna being in complementary devices of the power transmitter and the power receiver.

According to an aspect of the invention there is provided a method of wireless power transfer from a power transmitter to a power receiver using an electromagnetic power transfer signal, the device being one of the power transmitter and the power receiver, and the method comprising: a power transfer coil receiving or generating the power transfer signal; controlling the device to perform power transfer during a power transfer phase, the power transfer phase comprising power transfer intervals where power is transferred and foreign object detection time intervals during which a power level of the power transfer signal is reduced; providing a magnetic shielding element positioned between the power transfer coil and a power transfer coil of a complementary device during power transfer operation, the complementary device being the other device of the power receiver and the power transmitter; wherein the magnetic shielding element comprises a magnetic shield material operating in a saturated mode during power transfer intervals and in a non-saturated mode during foreign object detection time intervals, a saturation point for the magnetic shield element being above a magnetic field strength generated by the power transfer signal during the power transfer time intervals and below a magnetic field strength generated during the foreign object detection time intervals.

According to an aspect of the invention there is provided method of operation for a wireless power transfer system performing wireless power transfer from a power transmitter to a power receiver using an electromagnetic power transfer signal, the wireless power transfer system comprising a first device being one of the power transmitter and the power receiver, the method comprising the first device performing the steps of: a first power transfer coil of the power transmitter generating the power transfer signal; a second power transfer coil of the power receiver receiving the power transfer signal; controlling the power transfer system to perform power transfer during a power transfer phase, the power transfer phase comprising power transfer intervals where power is transferred and foreign object detection time intervals during which a power level of the power transfer signal is reduced; providing a magnetic shielding element positioned between the first power transfer coil and the second power transfer coil during power transfer operation; wherein the magnetic shielding element comprises a magnetic shield material operating in a saturated mode during power transfer intervals and in a non-saturated mode during foreign object detection time intervals, a saturation point for the magnetic shield element being above a magnetic field strength generated by the power transfer signal during the power transfer time intervals and below a magnetic field strength generated during the foreign object detection time intervals.

In some embodiments, there may be provided a wireless power transfer system comprising a power transmitter and a power receiver, at least one of the power transmitter and the power receiver comprising: a power transfer coil for receiving or generating the power transfer signal; a controller for controlling the device to perform power transfer during a power transfer phase, the power transfer phase comprising power transfer intervals where power is transferred and foreign object detection time intervals during which a power level of the power transfer signal is reduced; a magnetic shielding element positioned between the power transfer coil and a power transfer coil of a complementary device during power transfer operation, the complementary device being the other device of the power receiver and the power transmitter; wherein the magnetic shielding element comprises a magnetic shield material having a saturation point such that it operates in a saturated mode during power transfer intervals and in a non-saturated mode during foreign object detection time intervals, the saturation point being above a magnetic field strength generated by the power transfer signal during the power transfer time intervals and below a magnetic field strength generated during the foreign object detection time intervals.

In such a system, at least one of the power transmitter and the power receiver comprising: a foreign object detection antenna, and a foreign object detector arranged to generate a drive signal to drive the foreign object detection antenna to generate a foreign object detection electromagnetic test signal during the foreign object detection time intervals and perform foreign object detection in response to the drive signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
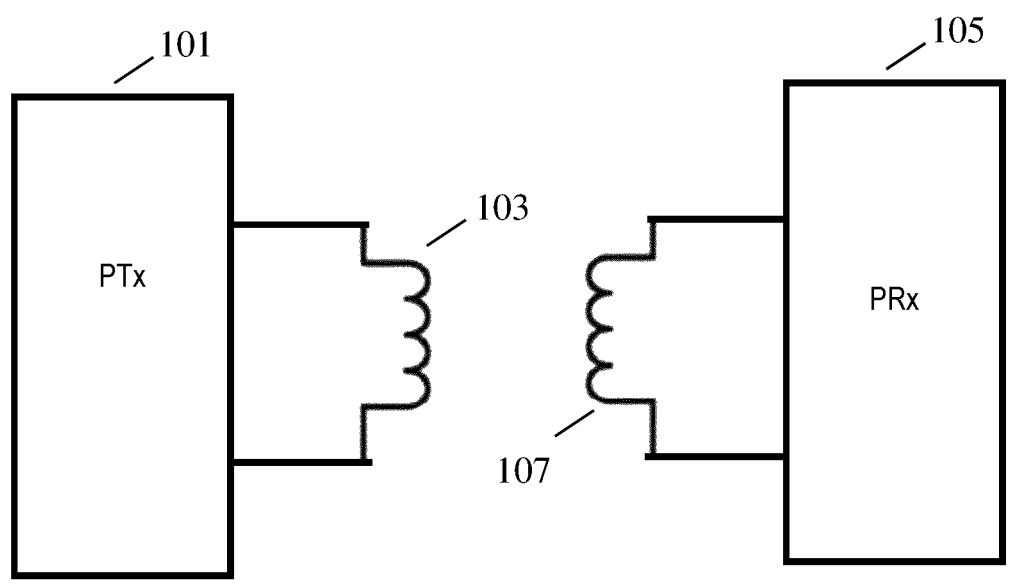
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter power transfer coil/inductor 103. The system further comprises a power receiver 105 which includes (or is coupled to) a receiver power transfer coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may correspond to the electromagnetic power transfer component representing the energy transfer from the power transmitter to the power receiver, and may be considered to correspond to the component of the generated electromagnetic field that transfers power from the power transmitter to the power receiver. For example, if there is no loading of the receiver power transfer coil 107, no power will be extracted by the power receiver from the generated electromagnetic field (apart from losses). In such a scenario, the driving of the transmitter power transfer coil 103 may generate an electromagnetic field of potentially high field strength but the power level of the power transfer signal will be zero (apart from losses).

The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter power transfer coil 103 and the receiver power transfer coil 107 are loosely coupled and thus the receiver power transfer coil 107 picks up (at least part of) the power transfer signal from the power transmitter 101. Thus, the power is transferred from the power transmitter 101 to the power receiver 105 via a wireless inductive coupling from the transmitter power transfer coil 103 to the receiver power transfer coil 107. The term power transfer signal is mainly used to refer to the inductive signal/magnetic field between the transmitter power transfer coil 103 and the receiver power transfer coil 107 (the magnetic flux signal), but it will be appreciated that by equivalence it may also be considered and used as a reference to an electrical signal provided to the transmitter power transfer coil 103 or picked up by the receiver power transfer coil 107.

In the example, the power receiver 105 is specifically a power receiver that receives power via the receiver power transfer coil 107. However, in other embodiments, the power receiver 105 may comprise a metallic element, such as a metallic heating element, in which case the power transfer signal directly induces eddy currents resulting in a direct heating of the element (such as e.g. directly in a pan heating element).

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high-power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

In order to have optimal performance in a wireless power transfer system such as that of FIG. 1, it is desirable for the power transfer coils 103, 107 of the power transmitter 101 and the power receiver 105 to be closely aligned such that they share the maximum possible/practicable amount of magnetic flux. It is therefore desirable for the coils 103, 107 to be geometrically aligned in order to maximize the coupling factor (K) between the transmitter and receiver coils.

Figure 2:
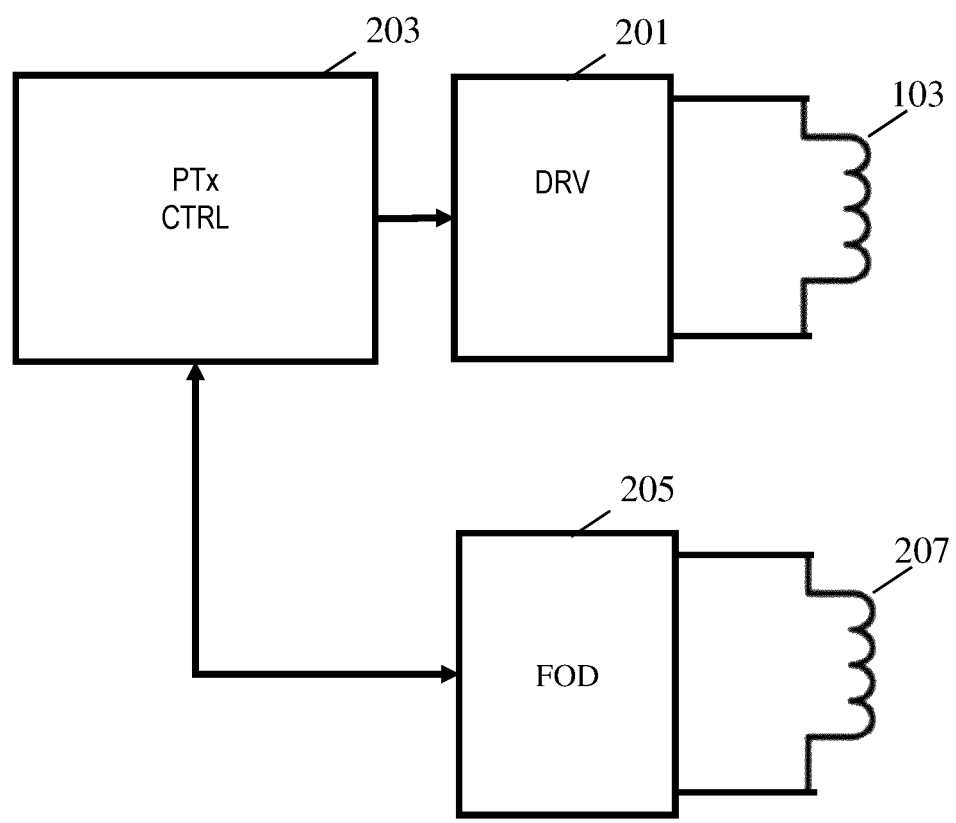
FIG. 2 illustrates an example of elements of a power transmitter in accordance with some embodiments of the invention.
Figure 3:
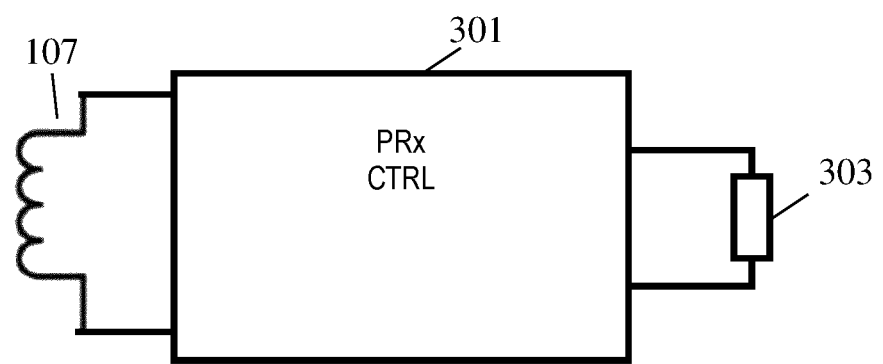
FIG. 3 illustrates an example of elements of a power receiver in accordance with some embodiments of the invention.

FIG. 2 illustrates elements of the power transmitter 101 and FIG. 3 illustrates elements of the power receiver 105 of FIG. 1 in more detail.

The power transmitter 101 includes a driver 201 which can generate a drive signal that is fed to the transmitter power transfer coil 103 which in return generates an electromagnetic field and thus the electromagnetic power transfer signal which provides power transfer to the power receiver 105. The power transfer signal is provided (at least) during a power transfer phase.

The driver 201 may typically comprise an output circuit in the form of an inverter, typically formed by driving a full or half bridge as will be well known to the skilled person.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications.

The power transmitter controller 203 is in particular arranged to control the generation of the drive signal by the driver 201, and it can specifically control the power level of the drive signal, and accordingly the level of the generated power transfer signal/electromagnetic field. The power transmitter controller 203 comprises a power loop controller controlling a power level of the power transfer signal in response to power control messages received from the power receiver 105 during the power control phase.

In the power receiver 105, the receiver coil 107 is coupled to a power receiver controller 301 which couples the receiver coil 107 to a load 303. The power receiver controller 301 includes a power control path which converts the power extracted by the receiver coil 107 into a suitable supply for the load 303. In addition, the power receiver controller 301 may include various power receiver controller functionality required to perform power transfer, and in particular functions required to perform power transfer in accordance with the Qi specifications.

The power receiver 105 and the power transmitter 101 comprises functionality for communicating data such as the power control messages. The communication may be achieved using the power transfer signal as a communication carrier, e.g. by the power transmitter 101 communicating data by frequency or phase modulation of the power transfer signal and the power receiver 105 communicating data by load modulation of the power transfer signal as will be known to the skilled person.

Alternatively or additionally, the communication may be performed via a separate communication channel implemented using a separate communication system, including typically separate antennas. The use of a separate and dedicated communication system means that the communication and the power transfer functionality and operation can be individually optimized for their specific purpose. For example, the signals used for the different functions may be individually optimized. As an example, efficient power transfer may often be achieved for signals having relatively low frequencies in the range from e.g. 20 kHz to 500 kHz whereas efficient short range communication may often be achieved for much higher frequencies, such as e.g. above 10 MHz or indeed much higher.

As a specific example, the communication may be implemented using a short range communication system such as NFC or RFID communication systems. Such communication approaches use a frequency of 13.56 MHz and separate communication coils or antennas may be included and arranged to communicate using carriers having this frequency and following the specific NFC or RFID Standards.

The system of FIG. 1 further comprises functionality for foreign object detection and the following description will focus on foreign object detection being performed by the power transmitter although in some embodiments foreign object detection may alternatively or additionally be performed by the power receiver.

In wireless power transfer systems, the presence of an object (typically a conductive element extracting power from the power transfer signal and not being part of the power transmitter 101 or the power receiver 105, i.e. being an unintended, undesired, and/or interfering element to the power transfer) may be highly disadvantageous during a power transfer. Such an undesired object is in the field known as a foreign object.

A foreign object may not only reduce efficiency by adding a power loss to the operation but may also degrade the power transfer operation itself (e.g. by interfering with the power transfer efficiency or extracting power not directly controlled e.g. by the power transfer loop). In addition, the induction of currents in the foreign object (specifically eddy currents in the metal part of a foreign object) may result in an often highly undesirable heating of the foreign object.

In order to address such scenarios, wireless power transfer systems often include functionality for foreign object detection. Specifically, the power transmitter may comprise functionality seeking to detect whether a foreign object is present. If so, the power transmitter may e.g. terminate the power transfer or reduce the maximum amount of power that can be transferred.

Typical approaches are based on detecting a power loss (by comparing the transmitted and the reported received power) or detecting degradations in the quality Q of the output resonance circuit generating the power transfer signal. In some systems, a separate foreign object detection antenna may be used to generate a dedicated foreign object detection electromagnetic signal with the foreign object detection being based on detecting any effect on the foreign object detection electromagnetic signal that may be due to a foreign object being present.

In the example of FIG. 2, the power transmitter 101 comprises a foreign object detector 205, which is arranged to perform foreign object detection. The foreign object detector 205 is coupled to foreign object detection antenna 207 and is arranged to generate a drive signal for this. The drive signal causes the foreign object detection antenna 207 to generate a foreign object detection electromagnetic test signal, i.e. an electromagnetic field is generated by the foreign object detection antenna 207. The foreign object detector 205 is further arranged to determine/measure a parameter of the drive signal and to perform a foreign object detection test in response to the parameter. Specifically, if the parameter meets a given criterion, the foreign object detector 205 will consider that the potential presence of a foreign object detection has been detected.

The parameter(s) determined, and the specific foreign object detection criterion used, will depend on the specific preferences and requirements of the individual embodiment. In particular, the foreign object detection approaches previously mentioned and known from e.g. foreign object detection using the power transfer signal may also be used by the foreign object detector 205 based on the drive signal and the foreign object detection electromagnetic test signal (henceforth also referred to simply as the test signal). Thus, specifically, a foreign object detection may be considered to be detected if the amount of power being extracted from the drive signal/test signal exceeds a given threshold, or if e.g. a dampening of a resonance circuit comprising the foreign object detection antenna 207 exceeds a threshold.

As will be described in more detail in the following, the described system utilizes a time division approach during the power transfer phase wherein operations, such as foreign object detection (and e.g. possibly communication) and power transfer may be performed in different time intervals thereby allowing the interference between these (specifically the impact of the power transfer on the foreign object detection/communication) to be reduced substantially.

Figure 4:
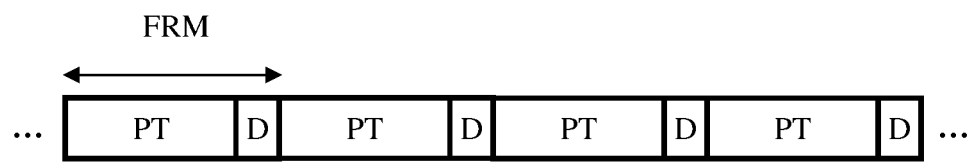
FIG. 4 illustrates an example of a time frame for a power transfer system in accordance with some embodiments of the invention.

Specifically, for the wireless power transfer system, the power transfer signal is subject to a repeating time frame as shown in FIG. 4 which comprises at least one power transfer time interval PT and one foreign object detection time interval D.

The power level of the power transfer signal is reduced during the foreign object detection time interval relative to the power transfer time interval, and typically the maximum allowable power is no less than 5, 10, or 50 times lower than the power level during the foreign object detection time interval than during the power transfer time interval. The reduction in the power level may result from actions at the power transmitter and/or at the power receiver. In some embodiments, the power transmitter may be arranged to switch off the power transfer signal during the foreign object detection time interval.

The power transmitter (and/or the power receiver) may then arrange for foreign object detection time interval to be performed during the foreign object detection time interval. Specifically, the power transfer signal may be switched off during foreign object detection time intervals and the foreign object detector 205 may instead proceed to generate the drive signal/test signal and check whether a foreign object is present or not. In this way, it can be achieved that the impact of the power transfer and the power transfer signal on the foreign object detection can be reduced, and often minimized.

In the described system, a time division approach is thus applied where power transfer and foreign object detection are performed in different time intervals. Specifically, the power transmitter controller 203 and the power receiver controller 301 are arranged to control respectively the power transmitter and the power receiver to perform power transfer during power transfer intervals and foreign object detection during foreign object detection time intervals, where the power transfer intervals and foreign object detection time intervals are typically disjoint and specifically non-overlapping. An example of the approach is shown in FIG. 4 where a repeating time frame comprises a power transfer interval PT in which power transfer is performed (and no foreign object detection) and a foreign object detection time interval D in which foreign object detection is performed (and no power transfer). Thus, in the example, a time frame is divided into power transfer intervals/time slots in which the power transfer signal is generated but typically no foreign object detection test signal is generated, and foreign object detection time intervals/time slots in which no power transfer signal is generated and foreign object detection is performed (a foreign object detection test signal is generated). In the example, the transmitter power transfer coil 103 and the receiver power transfer coil 107 are active during the power transfer intervals and the foreign object detector 205 and the foreign object detection antenna 207 are active during foreign object detection intervals.

It will be appreciated that in some embodiments, the time intervals may have dynamically varying durations and that the time frame may have a dynamically varying duration. It will also be appreciated that the time frame may include other time intervals in which other operations or combinations are performed (for example, the time frame may e.g. include time slots in which communication is performed).

The separation of power transfer and foreign object detection in the time domain may provide a particularly efficient separation of the impact of one operation on the other, and specifically the interference caused by the power transfer signal on the foreign object detection may be reduced or eliminated completely. However, even in this case the separate foreign object detection and power transfer functions may have an impact on each other. In particular, the functionality required to support the functions may have an impact. Specifically, the presence of both a power transfer coil and a foreign object detection antenna may have an impact. Indeed, the presence of the foreign object detection antenna may influence the positioning and resulting distance between the power transfer coils. Similarly, the presence of often large power transfer coils may have significant impact on the foreign object detection electromagnetic test signal. Therefore, the specific construction and design of the different functionalities is an important challenge to address.

The problem is exacerbated by the fact that both the power transfer coils and the foreign object detection antenna tend to have the same requirement in that they both are required to generate electromagnetic fields in the environment outside the power transmitter.

In some embodiments, the foreign object detection antenna may for example be a foreign object detection test coil which is coaxial with the power transfer coil. The coils may have common center axis around which they are distributed.

Figure 5:
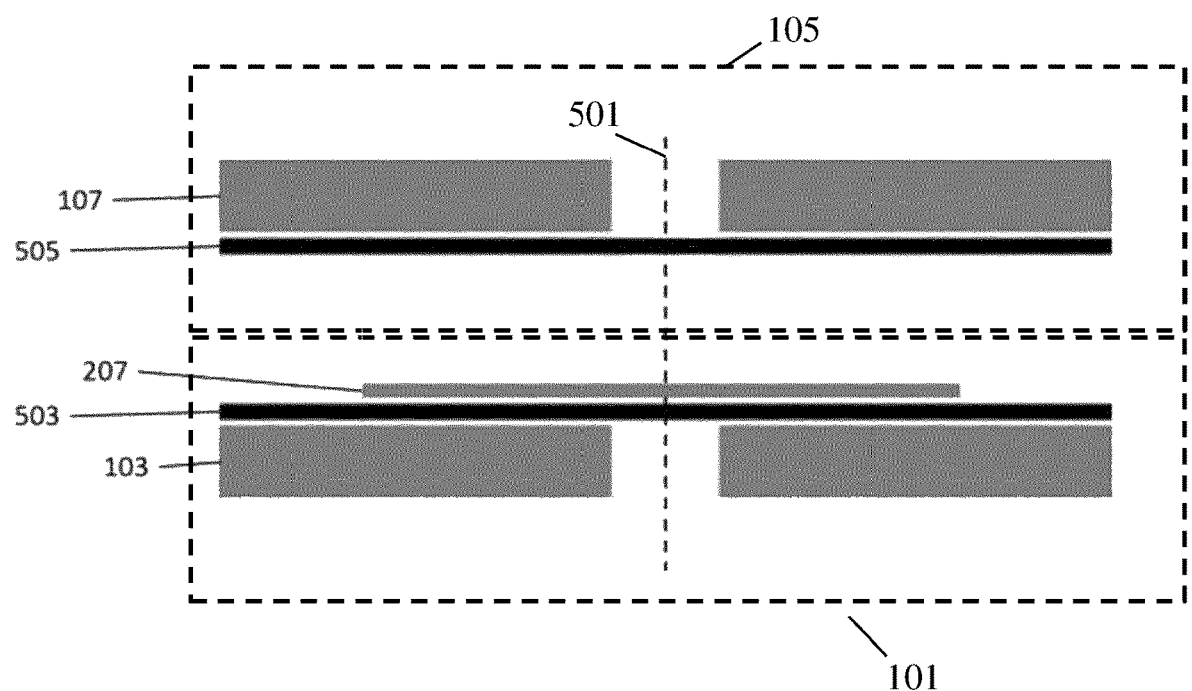
FIG. 5 illustrates an example of coil arrangements for a power transfer system in accordance with some embodiments of the invention.

FIG. 5 illustrates a cross section of such an arrangement for both a power transmitter and a power receiver where the devices are positioned in a(n optimal) configuration for power transfer. In the example, the power receiver 105 is positioned on top of the power transmitter 101.

The power transmitter 101 comprises the transmitter power transfer coil 103 generating the power transfer signal. In the example of FIG. 5, the transmitter power transfer coil 103 is illustrated by two areas reflecting the cross section of the area comprising the windings and reflecting that a center area is free of windings.

The foreign object detection antenna 207 is positioned on top of the transmitter power transfer coil 103 towards the power receiver 105. FIG. 5 illustrates a typical example where the foreign object detection antenna 207 is a coil which is substantially smaller than the transmitter power transfer coil 103. Further, in the example of FIG. 5 the windings of the foreign object detection antenna 207 also fill the center area.

The transmitter power transfer coil 103 and the foreign object detection antenna 207 are coaxial and symmetrically distributed around a center axis 501. They are also substantially invariant to rotation around the center axis 501.

Similarly, the power receiver 105 comprises the receiver power transfer coil 107 for receiving the power transfer signal. In the example of FIG. 5, the receiver power transfer coil 107 is illustrated by two areas reflecting the cross section of the area comprising the windings and reflecting that a center area is free of windings.

The receiver power transfer coil 107 is in the specific example coaxial and symmetrically distributed around the same as the center axis for the power transmitter 101 (reflecting optimal positioning of the power receiver 105 on the power transmitter 101). It is also substantially invariant to rotation around the center axis 501.

Although FIG. 5 illustrates an example where the power receiver is optimally placed with respect to the power transmitter such that the center axis 501 is common to both the coil arrangement for the power transmitter and for the power receiver, it will be appreciated that the power receiver will typically be placed with some misalignment and the center axis 501 will not completely line up for the power receiver to the power transmitter. However, it will be appreciated that whereas this may reduce the coupling by some amount, the approach and operation will still be applicable and will still provide the described advantages and benefits as long as the misalignment is not too large. The exact misalignment which is acceptable will depend on the specific preferences and requirements of the individual embodiment (as well as e.g. the dimensions of the coils).

The arrangement of FIG. 5 may specifically be for cordless kitchen appliances with two large power transfer coils 103, 107 being used to transmit power from the transmitter to the receiver. The foreign object detection antenna 207 is placed between the power transfer coils 103, 107.

The arrangement may provide a very good coupling between the power transfer coils 103, 107 as well as good foreign object detection as the foreign object detection antenna 207 is positioned close to the area between the power receiver and the power transmitter.

However, an issue with such an arrangement is that even in the case of using time division between the foreign object detection and power transfer, the presence of the coils may have an impact on each other. Specifically, the large metal power transfer coils may have a significant impact on the performance of the foreign object detection, and specifically on the generated foreign object detection electromagnetic detection signal.

Specifically, the presence of the power transfer coils may affect the foreign object detection by losing part of the transmitted power in the power coils. The power transfer coils couple with the foreign object detection test signal and absorb a part of the power. This acts like a foreign object would and thus it may be difficult to separate the presence of the large power transfer coils 103, 107 from the presence of a foreign object. The power transfer coils (and its attached circuitry) can also add unwanted resonances in the foreign object detection system.

Typically foreign object detection is relatively indiscriminatory and essentially simply detects whether any conductive elements are present that may sufficiently affect the generated test signal. However, this may in many scenarios be problematic. For example, the power receiver and indeed power transmitter itself typically comprises various elements of conductive parts which are often referred to as friendly metal. There is a risk that such friendly metal may be detected as a foreign object, or otherwise degrade the accuracy of the foreign object detection.

Figure 6:
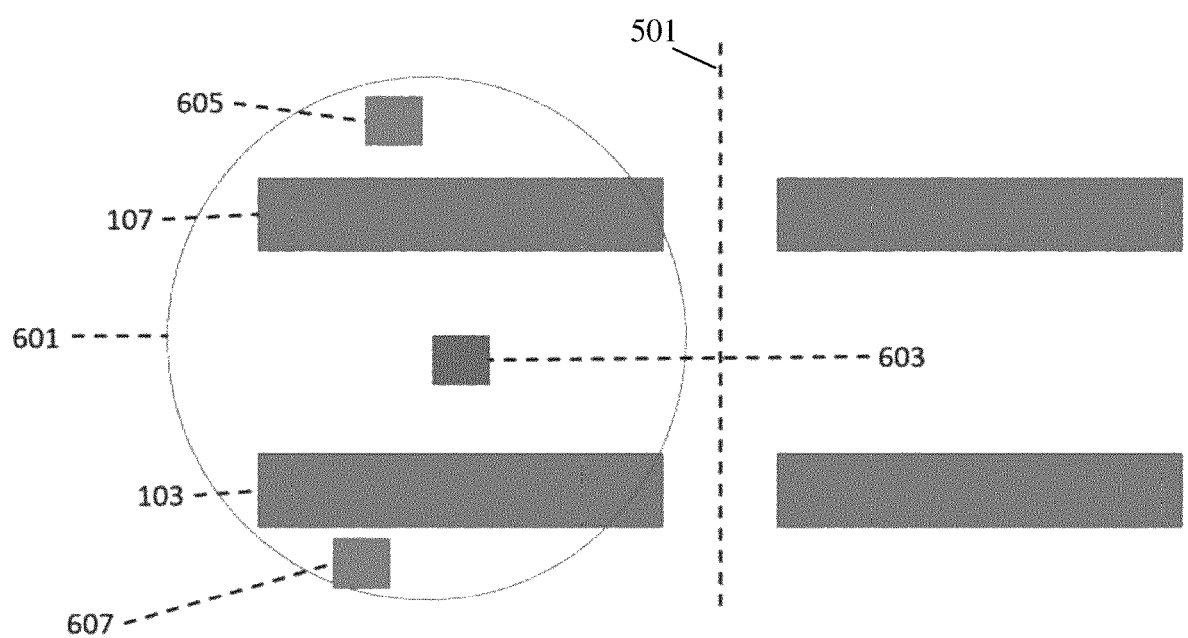
FIG. 6 illustrates an example of coil arrangements for a power transfer system in accordance with some embodiments of the invention.

For example, FIG. 6 illustrates an arrangement where foreign object detection is based on detecting power loss from an electromagnetic field generated by the transmitter coil 103. This may result in an effective detection area 601 (for a given size of metal object) that will allow a foreign object 603 to be detected. However, the metal of both the transmitter coil 103 and the receiver coil 107 will also impact the loading of the generated test signal and consequently must be compensated for by the foreign object detection. This may be difficult, especially for the power receiver as the foreign object detection of the power transmitter is designed without knowledge of the specific properties of the specific power receiver.

Further other conductive parts of the power transmitter and the power receiver may impact the detection. For example, it may be difficult to detect the difference between friendly metal 605, 607 of the power receiver and the power transmitter respectively, and a foreign object 603.

Figure 7:
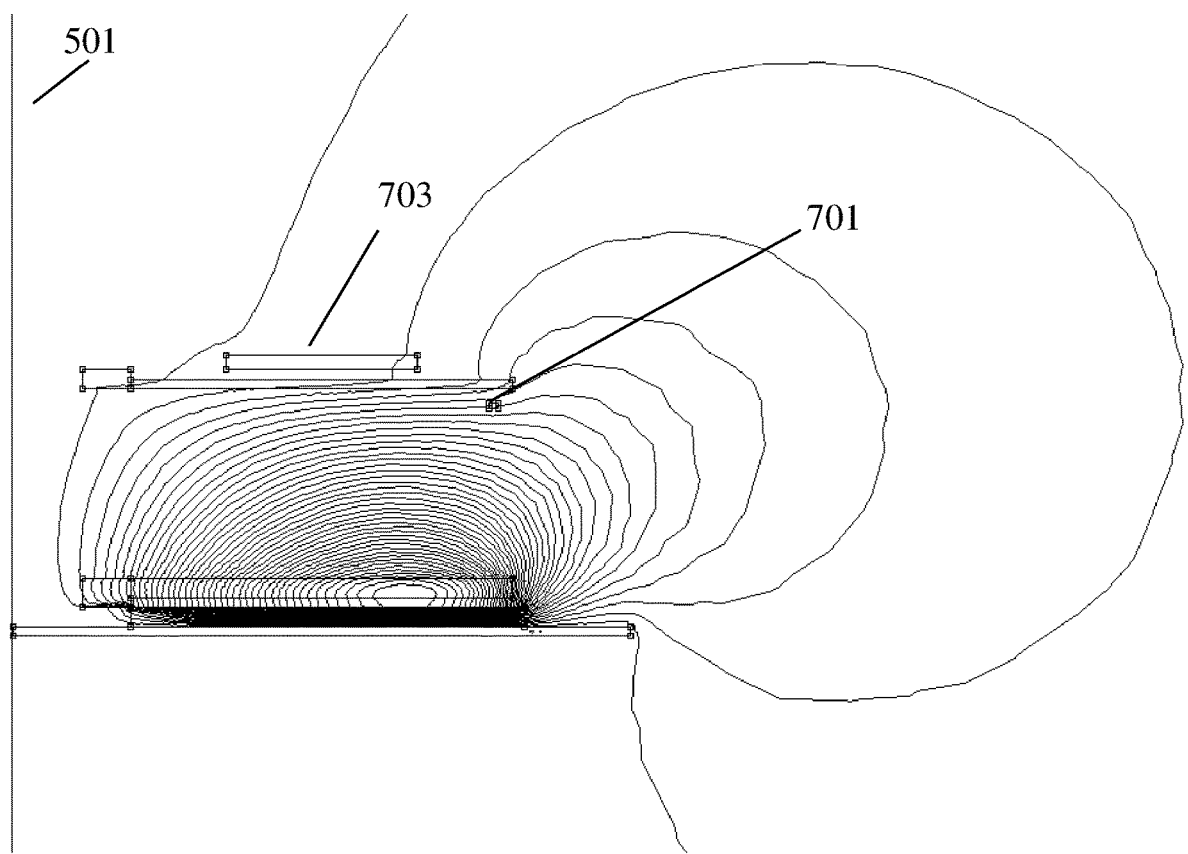
FIG. 7 illustrates an example of magnetic field distribution for a coil arrangement for a power transfer system in accordance with some embodiments of the invention.

FIG. 7 shows an example of the field lines of a magnetic field of the example of FIG. 6 (only right side of the arrangement is shown). Foreign object detection of a small foreign object 701 in the presence of the transmitter coil 103, receiver coil 107, and friendly metal 703 may be very difficult.

In the system of FIGS. 1-5, foreign object detection may be improved by the inclusion of one or more magnetic shielding elements.

In the configuration of FIG. 5, a first magnetic shielding element 503 is positioned between the power coil 103 and the foreign object detection antenna 207. Similarly, a second magnetic shielding element 505 is positioned between the receiver coil 107 and the power transmitter 101. Thus, both magnetic shielding elements are positioned between their respective power coil and the complementary power device, and between their respective power coil and the foreign object detection antenna 207 (when in use).

The magnetic shielding elements may specifically be thin shielding sheets which do not significantly increase the height of the arrangement (e.g. it does not substantially increase the distance between the power transfer coils).

In the arrangement of FIG. 5, the foreign object detection antenna 207 is during the power transfer operation positioned such that it is the closest coil to both the receiver coil 107 and the transmitter coil 103. The transmitter coil 103 and the foreign object detection antenna 207 are arranged such that the foreign object detection antenna 207 is closer than the transmitter coil 103 to the surface through which power transfer takes place. For both devices, the magnetic shielding element is positioned such that it is closer to the power transfer surface than the power transfer coil (but further from the power transfer surface than the foreign object detection antenna 207 if one such is present in the device). The arrangement is typically such that the foreign object detection antenna 207, and the magnetic shielding elements 503, 505 are positioned between the power transfer coil of the device itself (the power transmitter 101 or the power receiver 105) and the power transfer coil of the other device during power transfer operation (the complementary device). The foreign object detection antenna 207 is specifically positioned between the transmitter coil 103 and the surface coupling to the power receiver 105.

The magnetic shielding elements comprise a magnetic shield material which is arranged such that it has a saturation point that causes it to operate in a saturated mode during power transfer intervals and in a non-saturated mode during foreign object detection time intervals. Thus, the magnetic shield material is selected such that for the higher magnetic field strengths during the power transfer operation, saturation is reached whereas for the much lower field strengths during foreign object detection the magnetic shield material remains in its non-saturated mode.

It will be appreciated that different materials may be used in different embodiments but in many embodiments the magnetic shield material may be ferrite and the magnetic shielding element may be a thin ferrite sheet. Thus, in many embodiments, a thin ferrite sheet is placed between the foreign object detection antenna 207 and power coil (possibly on both the transmitter and receiver side although in many scenarios only the power receiver or the power transmitter may utilize such a magnetic shielding element).

When thin ferrite sheets are put in between the foreign object detection antenna 207 and the power transfer coils 103, 107, the foreign object detection antenna 207 and the test signal is much less influenced by the power transfer coils 103, 107 or indeed by metallic elements on the remote side of the magnetic shielding element. The ferrite material has a high permeability $\mu$ for low magnetic field strengths as experienced during foreign object detection and is accordingly able to guide the flux of the test signal away from the power transmitter coils (e.g. made of copper) and friendly metal. The ferrite sheets may effectively create an artificial electromagnetic distance increase between the power transfer coils and the foreign object detection antenna 207 during foreign object detection. This can be considered as a magnetic isolation of the foreign object detection antenna 207 from the conductive windings of the power coils.

Figure 8:
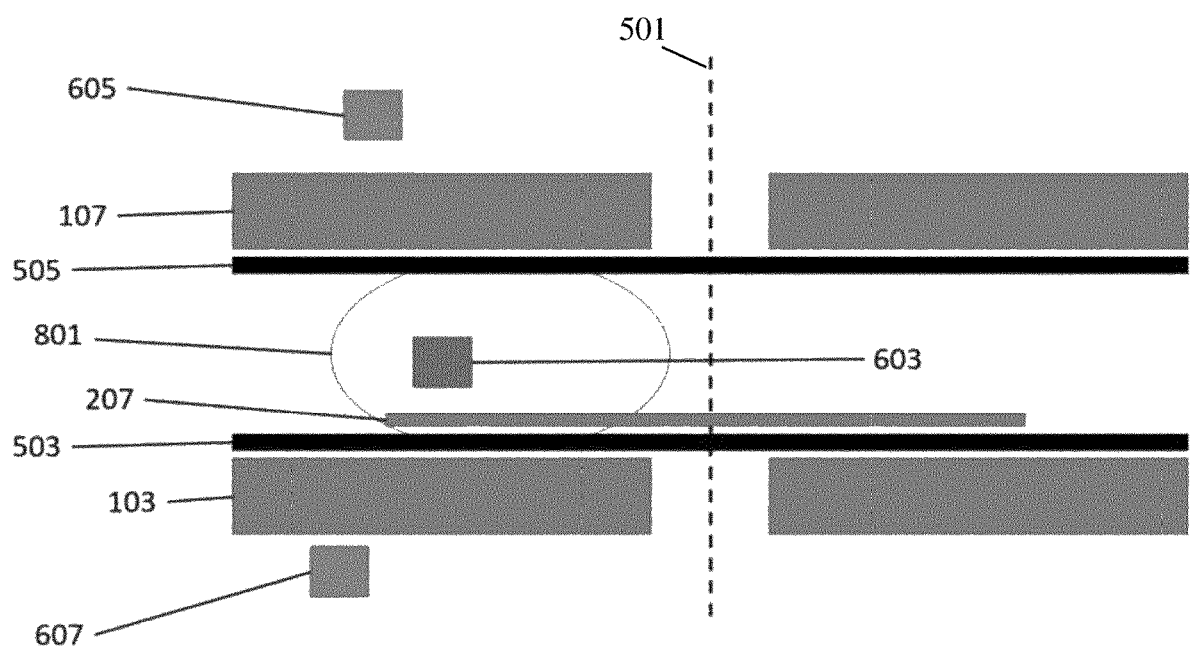
FIG. 8 illustrates an example of coil arrangements for a power transfer system in accordance with some embodiments of the invention.

Effectively, as illustrated in FIG. 8, the magnetic shielding elements may restrict the foreign object detection electromagnetic test signal to a region 801 between the magnetic shielding elements. Thus, a more focused and restricted foreign object detection test can be performed. The magnetic shielding elements, 505, 503 in particular reduces the impact from the power coils, 103, 107 and friendly metal being part of the power receiver or power transmitter. As a result, the variation in the test signal and thus the detected parameters of the drive signal are predominantly determined by whether a foreign object is present or not and thus improved foreign object detection, and especially foreign object detection of smaller metallic elements, can be achieved.

Figure 9:
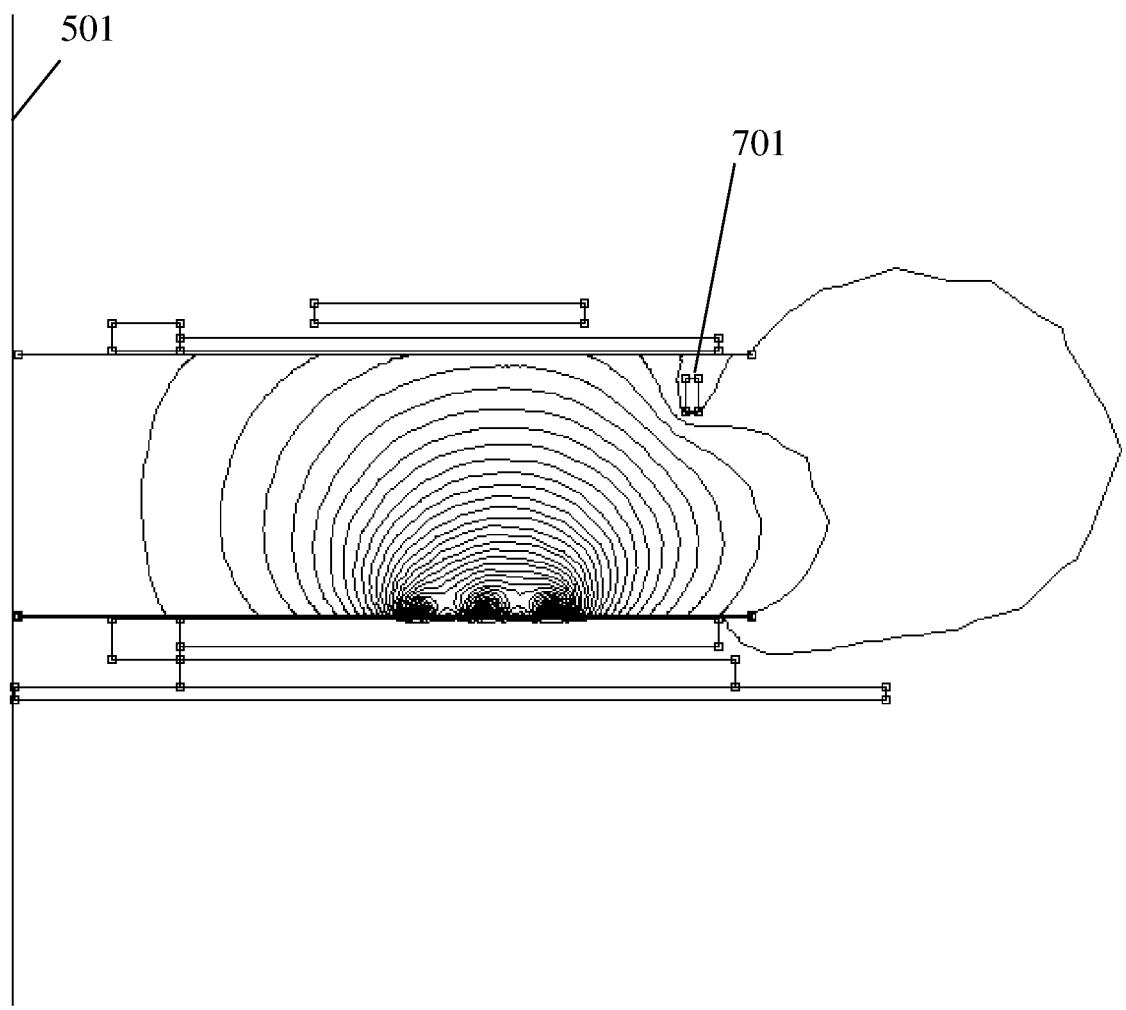
FIG. 9 illustrates an example of magnetic field distribution for a coil arrangement for a power transfer system in accordance with some embodiments of the invention.

This may be illustrated by FIG. 9 which illustrates how an electromagnetic test signal generated by a foreign object detection antenna 207 is concentrated within the region between the two magnetic shielding elements thereby resulting in a larger relative impact of a small foreign object (only right side of the arrangement is shown).

However, during the power transfer time intervals, the magnetic field is much stronger and the ferrite will saturate. This will effectively render the effect of the magnetic shielding element insignificant and it will effectively have the same effect as air/vacuum. In other words, the effect of the magnetic shielding element will disappear, and the power transfer will proceed as if no magnetic shielding element is present.

Thus, in the approach, the magnetic shielding element may effectively behave like a switch and provide a very different effect and function during the foreign object detection time intervals than in the power transfer time intervals. This may provide the desired advantages of increasing isolation between the foreign object detection antenna and the power transfer coil during the foreign object detection time intervals without detrimentally affecting the power transfer.

Figure 10:
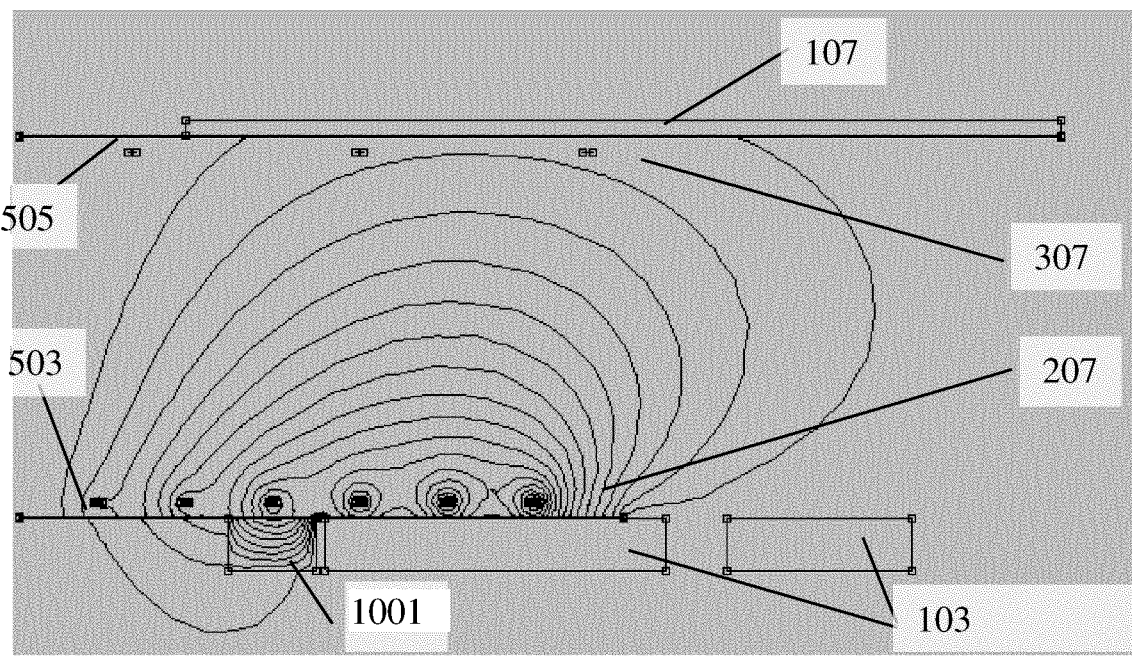
FIG. 10 illustrates an example of magnetic field distribution for a coil arrangement for a power transfer system in accordance with some embodiments of the invention.

The function during the foreign object detection time intervals may also be illustrated by FIG. 10. During such intervals, the foreign object detection antenna 207 generates a test signal for detection of foreign objects. During this operation, the ferrite sheets act as a shield between the foreign object detection antenna 207 (and/or 307) and the power transfer coils. The ferrite sheets will shield the foreign object detection antenna 207 from the power transfer coils and the negative effects of the presence and proximity of the power transfer coils on the foreign object detection antenna are severely reduced. Similarly, the sensitivity to friendly metal is reduced.

As illustrated in FIG. 10, the field lines may be concentrated within the ferrite sheets 503, 505 resulting in much reduced impact of the power transfer coils 103, 107. The flux lines are guided through the sheets, and the copper planes of the power transfer coils are effectively shielded from the foreign object detection antenna 207. It can also be seen that an effect is achieved both for the power receiver and the power transmitter with the flux lines being concentrated in the ferrite sheets and kept away from the windings of the power transfer coils. It should be noted that in the example of FIG. 10, a ferrite element 1001 is positioned next to inner windings of the transmitter power transfer coil 103 and thus flux lines are also guided through this element (it will also be appreciated that the transmitter power transfer coil 103 may comprise outer windings not shown in FIG. 10).

Thus, in the specific example, during foreign object detection, the first magnetic shielding element 503 acts as a shield between the foreign object detection antenna 207 and the transmitter coil 103 whereby the negative effects of the power coils (and other friendly metal) on the test signal generated by the foreign object detection antenna 207 is significantly reduced. The sheet is preferably selected to have positive characteristics at the frequency of the test signal (which is typically below 1 MHz depending on the specific preferences and requirements of the foreign object detection).

During power transfer the induced field from the transmitter coil 103 is a lot larger than the field strength of the test signal, and the shield will saturate immediately. When the shield is saturated it will behave like air and will have minimal influence on the coupling and power transfer between the power coils 103, 107.

Thus, the first magnetic shielding element 503 effectively behaves like a switch between the operation in the power transfer time intervals and in the foreign object detection time intervals. This may provide the desired advantages for foreign object detection without introducing unacceptable degradation to the power transfer.

Similarly, the second magnetic shielding element 505 may provide shielding against the friendly metal of the power receiver 105 and specifically against the receiver coil 107 itself.

The thin ferrite sheets used to form the first magnetic shielding element 503 and/or the second magnetic shielding element 505 reduce the impact of friendly metal on the foreign object detection. The high $\mu$ of the ferrite material allows this to guide the flux round the friendly metal. It creates an artificial distance increase between the foreign object detection antenna 207 and the friendly metal, so it can be seen as a magnetic isolation. The foreign object detection is typically performed using relatively low frequencies (less than 100 kHz) and ferrite may provide low losses and high permeability which is particularly advantageous for the intended operation.

The disadvantage of the shielding is that it reduces the coupling between the power coils but this may be substantially mitigated by keeping the sheets very thin and using material that effectively saturates at the power levels used for power transfer The specific characteristics of the magnetic shielding element and material may depend on the preferences and requirements of the individual embodiment.

In many embodiments, a thin magnetic shielding element may be used and typically it may have a thickness not exceeding 1 mm (or for some requirements not exceeding 0.5 mm, 2 mm or even 5 mm). This may in many embodiments provide an advantageous trade-off between the resulting distance between the power transfer coils and the magnetic shielding. It may typically, provide effective screening during foreign object detection without significantly impacting performance during power transfer.

Thus, whereas the magnetic shielding element may reduce the coupling between the power transfer coils, this may be kept to low levels by using very thin sheets to form the magnetic shielding elements. This allows the influence of the sheets on the power transfer to be negligible while keeping the advantages for/during foreign object detection. When the sheets are thin, it may furthermore be more practical to implement a magnetic shielding element which operates in a saturated mode during power transfer and in a non-saturated mode during foreign object detection. The thickness of the sheet may specifically be designed such that the foreign object detection will not result in the magnetic shielding element being saturated by the antenna under any circumstances (e.g. maximum test signal power). At the same time, the thickness may be designed to be sufficiently thin to allow it to be saturated during power transfer.

The specific material may also be selected and designed for as close to optimal performance as can reasonably be achieved. For example, the material may be selected to have as high permeability and low losses for the given foreign object detection frequency.

Figure 11:
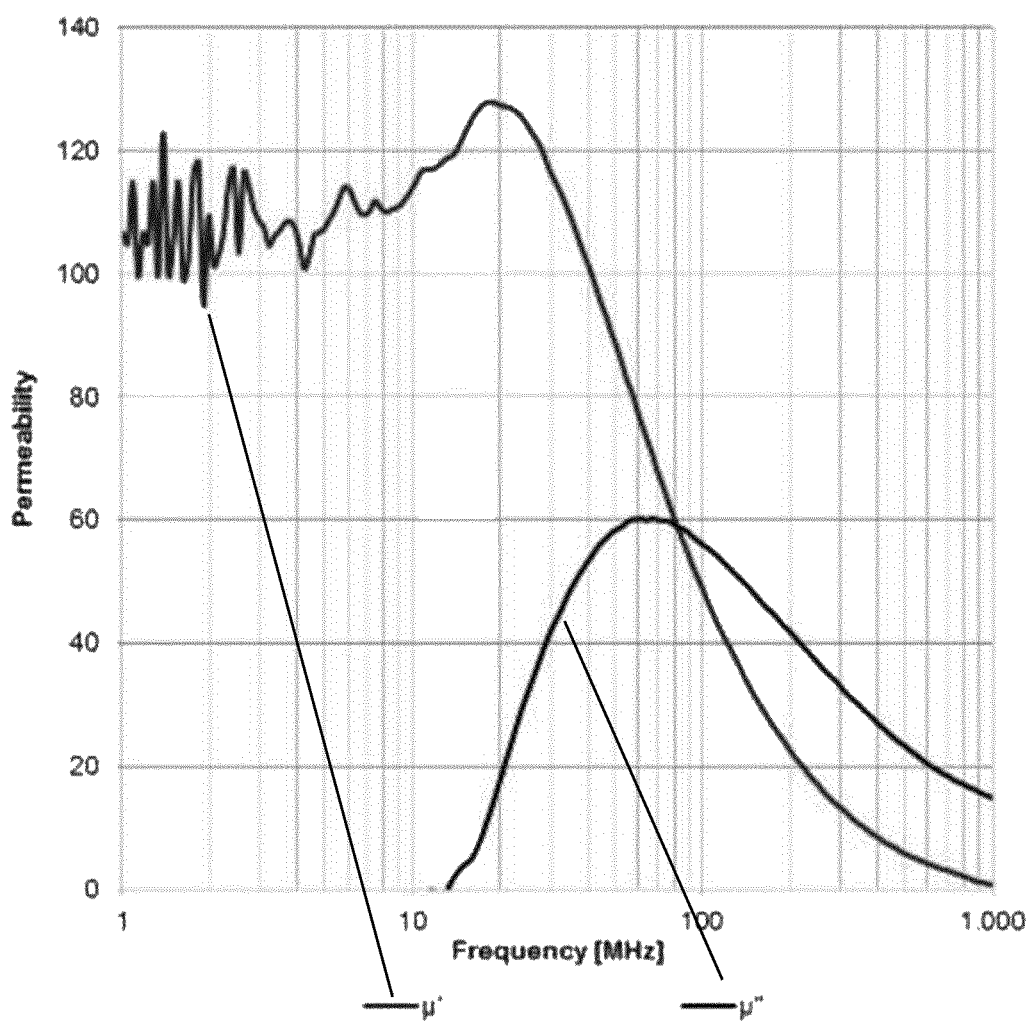
FIG. 11 illustrates some performance characteristics for a ferrite magnetic shielding layer.

For example, FIG. 11 illustrates an example of the permeability µ' and loss µ" for a ferrite material which is suitable for usage for lower frequencies for which the permeability µ' is high and the loss µ" is low for the ferrite material.

The specific magnetic field strength at which the ferrite material saturates may be different in different embodiments. The magnetic shielding element may be arranged to operate in the non-saturated mode for a power transfer level below e.g. 0.5 W, 1 W, 5 W, or 10 W.

Similarly, the magnetic shielding element may be arranged to operate in the saturated mode for a power transfer level above e.g. 0.5 W, 1 W, 5 W, or 10 W. The power level corresponding to the saturation point will typically be below a minimum power transfer level allowed or expected during normal power transfer.

The magnetic field strength in the magnetic shielding elements during the foreign object detection time intervals are typically predominantly given by the test signal. Indeed, in most embodiments, the power transfer signal may be switched off completely during the foreign object detection time intervals, i.e. where no power transfer signal is generated, and no power transfer occur during the foreign object detection time intervals. Thus, in such scenarios, the field strength is exclusively given by the generated electromagnetic test signal.

The foreign object detector 207 generates the drive signal causing the test signal and is arranged to generate the drive signal such that the electromagnetic field strength of the foreign object detection electromagnetic test signal in the magnetic shielding is below the saturation point.

In many embodiments, this may simply be done by generating a drive signal having an amplitude that ensures that the resulting field strength will be below the saturation point. In some embodiments, this may include a consideration of the maximum power transfer signal level that may be generated during foreign object detection time intervals.

Typically, the design is not critical, i.e. it is in many scenarios and embodiments possible to determine the amplitude such that it for the reasonably expected properties and positioning of the power receiver will generate a field strength sufficiently high to detect foreign objects yet sufficiently low to ensure that no saturation occurs.

In some embodiments, a dynamic and adaptive approach may be used to control the amplitude of the drive signal. For example, a small detector coil may be positioned on the side of the power coil to measure the field strength during foreign object detection time intervals. The amplitude of the drive signal may then be set to a value that is just below a value at which the small detector coil detects the presence of an electromagnetic field.

In general, the power transmitter may control the driving of the transmitter coil 103 and the foreign object detection antenna 207 such that the field strengths generated ensure saturation during power transfer time intervals and non-saturation during foreign object detection time intervals.

In many embodiments, the saturation point corresponds to a magnetic field strength higher than generated by the foreign object detection antenna during the foreign object detection time intervals and lower than generated by the power transfer coil during the power transfer time intervals.

Typically, the difference between the power levels/magnetic field strength generated during foreign object detection time intervals and during power transfer time intervals is high. For example, typical power levels for foreign object detection may be in the range of a few hundred mW whereas the power levels during power transfer may be in the range from 10 W and up, and indeed for e.g. kitchen appliances it may be substantially higher. It is thus typically possible to provide a magnetic shielding element that switches between the saturated and non-saturated modes in respectively the power transfer and foreign object detection time intervals with some margin.

In many embodiments, the saturation point for the magnetic shielding element may be for a magnetic field strength in the range of 100 mT to 1 T. A saturation point in this range typically provides a very efficient and reliable switch between non-saturated mode in the foreign object detection time intervals and saturated mode in the power transfer time intervals. The range typically provides such efficient switch for practical/typical power levels for typical foreign object detection and power transfer functions and operations. In many embodiments, particularly advantageous performance can be achieved for a saturation point for the magnetic shielding element being for a magnetic field strength in the range of 200 mT to 400 mT.

An advantage of the arrangement described is that it allows efficient operation and couplings to be achieved for large coils, and indeed it allows both large foreign object detection coils and large power transfer coils.

In many embodiments, the area of the foreign object detection coil implementing the foreign object detection antenna 207 is no less than 20 cm$^2$ (or possibly no less than 10 cm$^2$, 30 cm$^2$, 50 cm$^2$, 100 cm$^2$, for some uses). In many embodiments, the area of the power transfer coil is no less than 50 cm$^2$ (or possibly no less than 30 cm$^2$, 100 cm$^2$, 200 cm$^2$, 500 cm$^2$, for some uses). The area may be measured in the plane of planar coils/antennas. The area may be the area of the largest cross section of the coil/antenna.

The use of such large coils provides a number of advantages in many scenarios and embodiments. For example, it provides a large area of high magnetic field strength and therefore provides increased freedom in the placement of the power receiver. It may also facilitate foreign object detection in a larger area.

Also, a large power transfer coil typically allows an efficient design for higher power levels (more windings, thicker wires) and is thus particularly suitable for higher power levels such as those experienced in e.g. kitchen applications.

The previous description has focused on an embodiment where the foreign object detection is performed by the power transmitter 101. However, in other embodiments, the power receiver 105 may additionally or alternatively comprise functionality for performing foreign object detection.

Figure 12:
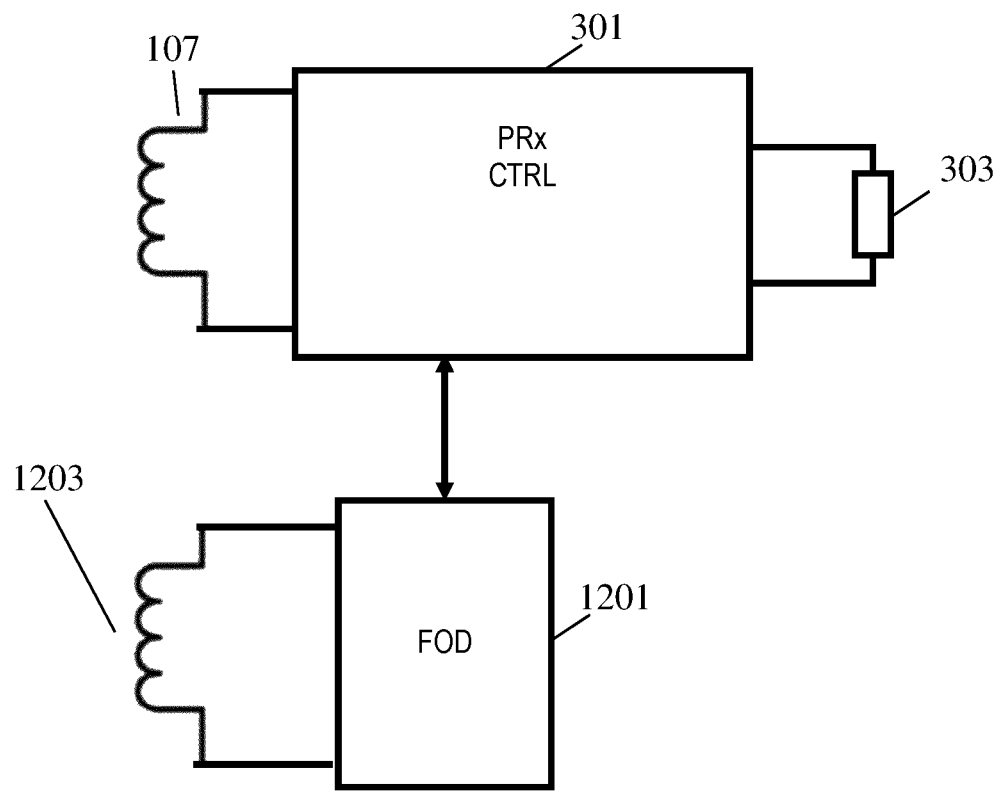
FIG. 12 illustrates an example of coil arrangements for a power transfer system in accordance with some embodiments of the invention.

For example, the power receiver 105 may in some embodiments also comprise a foreign object detection antenna 1203 and a foreign object detector 1201 as illustrated in FIG. 12. In such embodiments, the comments and description of the operation of the foreign object detection antenna 207 and the foreign object detector 205 during the power transfer time intervals may apply equally to the foreign object detection antenna 1203 and foreign object detector 1201 of the power receiver 105, mutatis mutandis.

Figure 13:
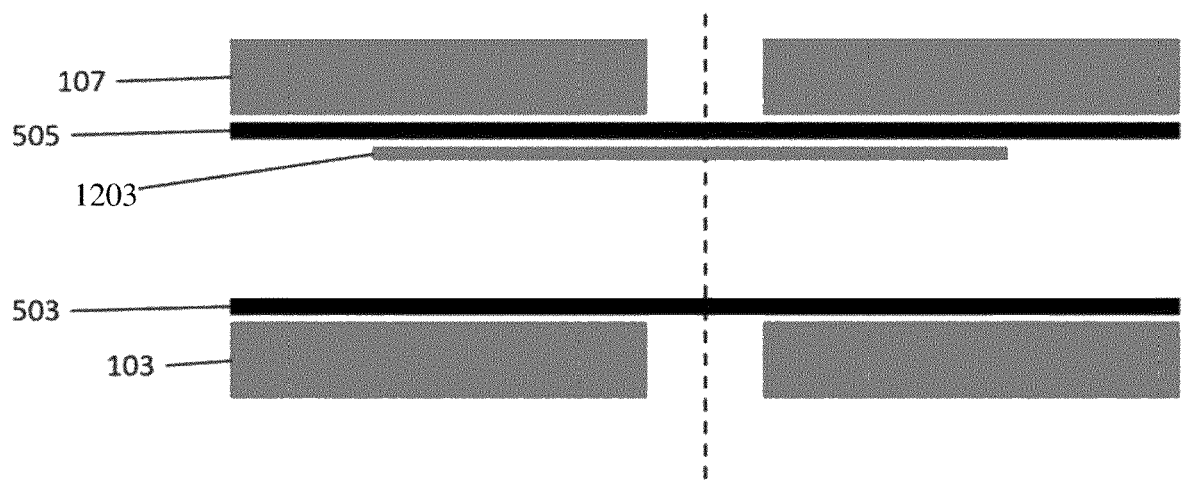
FIG. 13 illustrates an example of elements of a power receiver in accordance with some embodiments of the invention.

In such embodiments, the second magnetic shielding element 505 may be positioned between the foreign object detection antenna 1203 and the receiver coil 107 as illustrated in FIG. 13.

Thus, it will be appreciated that the description of the foreign object detection of the power transmitter may be equally apply to a corresponding/symmetric implementation and arrangements in the power receiver.

Further, in the previous example, both the power transmitter and the power receiver included a magnetic shielding element, but it will be appreciated that in some embodiments only the power transmitter or the power receiver may comprise a magnetic shielding element. Thus, in some embodiments, the described arrangement, and specifically the inclusion of the magnetic shielding element, may only be provided in either the power transmitter or the power receiver. Thus, it should be appreciated that the previous description of the coil/antenna configuration in the power transmitter is not reliant on any specific coil/antenna configuration at the power receiver, and similarly that the previous description of the coil/antenna configuration in the power receiver is not reliant on any specific coil/antenna configuration at the power transmitter. The described approach of using a magnetic shielding element is indeed applicable individually to both power transmitter and power receiver implementations.

In some embodiments, separate antennas may be used for generating the foreign object detection electromagnetic test signal and for performing foreign object detection based on a measurement of the foreign object detection electromagnetic test signal. In the previous examples, the foreign object detection electromagnetic test signal has been generated by the foreign object detection antenna 207 and the impact on the test signal by any potential foreign objects have been detected by measuring the impact on the drive signal used to generate the foreign object detection electromagnetic test signal, i.e. based on a measurement by the foreign object detection antenna 207.

However, in some embodiments, the measurement of the impact on the foreign object detection electromagnetic test signal may be by a different separate foreign object detection antenna, i.e. one antenna may be a foreign object test antenna generating the foreign object detection electromagnetic test signal and another foreign object detection antenna may be used to measure the foreign object detection electromagnetic test signal. Basically, the measurement of the impact on the foreign object detection electromagnetic test signal may be determined by a measurement of the signal induced in the foreign object detection antenna.

Figure 14:
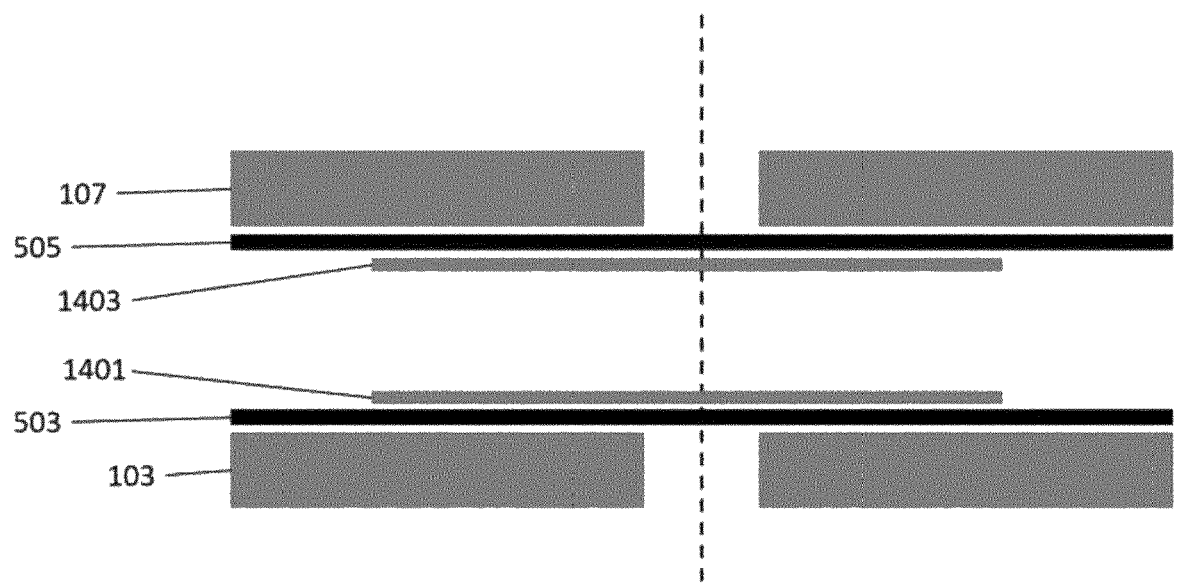
FIG. 14 illustrates an example of coil arrangements for a power transfer system in accordance with some embodiments of the invention.

Further, the foreign object test antenna and the foreign object detection antenna may be in different devices, i.e. one may be in the power receiver and one may be in the power transmitter. FIG. 14 illustrates an example of an arrangement where the power transmitter comprises a first foreign object antenna 1401 and the power receiver comprises a second foreign object antenna 1403. In this example, one of the two foreign object antennas may be used as a foreign object test antenna generating the foreign object detection electromagnetic test signal and the other antenna may be used as a foreign object detection antenna measuring the foreign object detection electromagnetic test signal. The first foreign object antenna 1401 may correspond to the foreign object detection antenna 207 and the second foreign object antenna 1403 may correspond to the foreign object detection antenna 1203 with one of these generating the electromagnetic test signal and the other measuring it.

For example, for a setup with the foreign object detection antenna 207 second foreign object detection antenna 1403 may be NFC antennas and the system may measure the power that the Tx NFC antenna sends and what the Rx NFC antenna receives. It may then check if that value changes, or if there are too many losses. If the difference between the received and transmitted power exceeds a threshold, a foreign object is considered to be detected.

Other types of antennas and different frequencies may be used in different embodiments.

Indeed, in some embodiments, the transmitter coil 103 and/or the receiver coil 107 may be used for one or both of the generation of the test signal and of the detection of the foreign object.

For example, the power transmitter 101 may be arranged to generate a test signal for foreign object detection during the foreign object detection time intervals. This signal may have a value that is much lower than during the power transfer time interval and the reduced magnetic field strength at the second magnetic shielding element 505 may result in this being in the non-saturated mode. In this way, the construction of the power receiver, and specifically the receiver coil 107, will effectively be screened from the generated electromagnetic test signal.

However, the magnetic field strength may be substantially higher at the first magnetic shielding element 503 due to this being closer to the transmitter coil 103 and specifically the field strength may be higher such that the first magnetic shielding element 503 is in a saturated mode. Accordingly, the transmitter coil 103 generates an electromagnetic test signal that will be affected by foreign objects in the vicinity, such as specifically between the power transmitter and the power receiver. Thus, foreign object detection may be performed at the power transmitter e.g. in response to properties of the drive signal generating the test signal. As a low complexity example, a foreign object detection may be considered to occur if the power of the drive signal fed to the transmitter coil 103 during the foreign object detection time interval exceeds a given threshold.

It will be appreciated that the same considerations may apply to the power receiver and that e.g. the power receiver may during foreign object detection time intervals generate a test signal using the receiver coil 107 and detect whether a foreign object is present depending on the properties of the corresponding drive signal (e.g. the extracted power level). Again, the signal level and saturation points may be selected such that the magnetic shielding element of the device generating the test signal is saturated whereas the magnetic shielding element of the complementary device is not saturated.

In some embodiments, both the power transmitter and the power receiver may be arranged to perform foreign object detection as described, and indeed these operations may be performed in parallel and simultaneously.

In many embodiments, only one of the first magnetic shielding element 503 and the second magnetic shielding element 505 may be present, i.e. only one of the power transmitter and the power receiver may comprise a magnetic shielding element.

For example, for an embodiment where foreign object detection is performed by the power transmitter using the transmitter coil 103 as described above, the power transmitter may not include any magnetic shielding element and only the power receiver may include a magnetic shielding element.

This may in many embodiments still provide a very substantial improvement. In particular, the foreign object detection of a device can often be adapted to compensate for the specific properties of the device itself. However, if the device is used with a large range of different devices, e.g. a power transmitter is used with a large range of different power receivers, then the specific properties of the device currently present is typically not known to a sufficient accuracy, and therefore cannot be sufficiently compensated. The presence of a magnetic shielding element in such devices may accordingly shield the specific properties and provide for a much improved foreign object detection.

As a specific example, providing a power receiver with a magnetic shielding element as exemplified by the power receiver 105 of e.g. FIG. 5 may support, enable, and provide for much improved foreign object detection by a conventional power transmitter that does not comprise any corresponding magnetic shielding element or which e.g. simply uses a conventional foreign object detection using the transmitter coil 103.

Thus, in particular, even just providing a single magnetic shielding element in a power transfer device which does not itself perform any foreign object detection may provide for substantially improved foreign object detection. The magnetic shielding element may provide an electromagnetic environment that is improved and suitable for more accurate foreign object detection, and specifically may provide an electromagnetic environment in which the electromagnetic effect of a foreign object is more significant and easier to detect.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization mode, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A power transmitter for transferring power to a power receiver, the power transmitter comprising:
   a first power transfer coil, wherein the first power transfer coil is arranged to generate a power transfer signal;
   a controller circuit,
      wherein the controller circuit is arranged to control the power transmitter so as to perform power transfer during at least one power transfer phase,
      wherein the power transfer phase comprises power transfer intervals and foreign object detection intervals,
      wherein power is transferred during the power transfers intervals,
      wherein a power level of the power transfer signal is reduced during at least one of the foreign object detection intervals;
   a magnetic shielding element,
      wherein the magnetic shielding element is positioned between the first power transfer coil and a second power transfer coil,
      wherein the second power transfer coil is a portion of the power receiver,
      wherein the magnetic shielding element comprises a magnetic shield material,
      wherein the magnetic shield material has a saturation point,
      wherein the saturation point is arranged such that the magnetic shield material operates in a saturated mode during power transfer intervals and in a non-saturated mode during foreign object detection intervals.

2. The power transmitter of claim 1,
   wherein the magnetic shielding element is a sheet element,
   wherein the sheet element has a thickness less than or equal to 1 mm.

3. The power transmitter of claim 1, wherein the magnetic shield material is a ferrite material.

4. The power transmitter of claim 1, further comprising:
   a foreign object detection antenna; and
   a foreign object detector circuit,
   wherein the foreign object detector circuit is arranged to generate a drive signal,
   wherein the drive signal is arranged to drive the foreign object detection antenna,
   wherein the driven foreign object detection antenna is arranged to generate a foreign object detection electromagnetic test signal during the foreign object detection intervals, wherein the foreign object detector circuit is arranged to perform foreign object detection in response to the foreign object detection electromagnetic test signal, wherein the magnetic shielding element is positioned between the first power transfer coil and the foreign object detection antenna.

5. The power transmitter of claim 4, wherein the foreign object detector circuit is arranged to generate the drive signal such that the drive signal restricts an electromagnetic field strength of the foreign object detection electromagnetic test signal in the magnetic shielding element to be below the saturation point.

6. The power transmitter of claim 1, wherein the foreign object detection antenna overlaps the first power transfer coil.

7. The power transmitter of claim 1, wherein the saturation point for the magnetic shield element is in a range from 100 mT to 1 T.

8. The power transmitter of claim 1, wherein the saturation point for the magnetic shield element is in a range from 200 mT to 400 mT.

9. A method of operating a power transmitter to send wireless power to a power receiver, wherein the power transmitter comprises a first power transfer coil, wherein the power receiver comprises a second power transfer coil, wherein a magnetic shield element is positions between the first power transfer coil and the second power transfer coil the method comprising:

generating the power transfer signal;

controlling the power transmitter to perform power transfer during at least one power transfer phase, wherein the power transfer phase comprises power transfer intervals and foreign object detection intervals, wherein power is transferred during the power transfers intervals, wherein a power level of the power transfer signal is reduced during at least one of the foreign object detection intervals; and using the magnetic shielding element in a saturated mode during power transfer intervals and in a non-saturated mode during foreign object detection intervals.

10. A computer program stored on a non-transitory medium, wherein the computer program when executed on a processor performs the method as claimed in claim 9.

11. A method of operating a power receiver to receive wireless power from power transmitter, wherein the power transmitter comprises a first power transfer coil, wherein a power receiver comprises a second power transfer coil, wherein a magnetic shield element is positioned between the first power transfer coil and the second power transfer coil, comprising:

Receiving a power transfer signal;

controlling the power receiver to receive a power transfer during at least one power transfer phase, wherein the power transfer phase comprises power transfer intervals and foreign object detection intervals, wherein power is transferred during the power transfers intervals, wherein a power level of the power transfer signal is reduced during at least one of the foreign object detection intervals; and using the magnetic shielding element in a saturated mode during power transfer intervals and in a non-saturated mode during foreign object detection intervals.

12. A computer program stored on a non-transitory medium, wherein the computer program when executed on a processor performs the method as claimed in claim 11.

13. A power receiver for receiving a power transfer from a power transmitter, the power receiver comprising:

a first power transfer coil, wherein the first power transfer coil is arranged to receive a power transfer signal;

a controller circuit, wherein the controller circuit is arranged to control the power receiver to perform power transfer during at least one power transfer phase, wherein the power transfer phase comprises power transfer intervals and foreign object detection intervals, wherein the power is transferred during the power transfers intervals, wherein a power level of the power transfer signal is reduced during at least one of the foreign object detection intervals;

a magnetic shielding element, wherein the magnetic shielding element is positioned between the first power transfer coil and a second power transfer coil, wherein the second power transfer coil is portion of the power transmitter, wherein the magnetic shielding element comprises a magnetic shield material, wherein the magnetic shield material has a saturation point, wherein the saturation point is arranged such that the magnetic shield material operates in a saturated mode during power transfer intervals and in a non-saturated mode during foreign object detection intervals.

14. The power receiver of claim 13, wherein the magnetic shielding element is a sheet element, wherein the sheet element has a thickness less than or equal to 1 mm.

15. The power receiver of claim 13, wherein the magnetic shield material is a ferrite material.

16. The power receiver of claim 13, further comprising:

a foreign object detection antenna; and a foreign object detector circuit, wherein the foreign object detector circuit is arranged to generate a drive signal, wherein the drive signal is arranged to drive the foreign object detection antenna, wherein the driven foreign object detection antenna is arranged to generate a foreign object detection electromagnetic test signal during the foreign object detection intervals, wherein the foreign object detector circuit is arranged to perform foreign object detection in response to the foreign object detection electromagnetic test signal, wherein the magnetic shielding element is positioned between the first power transfer coil and the foreign object detection antenna.

17. The power receiver of claim 16, wherein the foreign object detector circuit is arranged to generate the drive signal such that the drive signal restricts an electromagnetic field strength of the foreign object detection electromagnetic test signal in the magnetic shielding element to be below the saturation point.

18. The power receiver of claim 13, wherein the foreign object detection antenna overlaps the first power transfer coil.

19. The power receiver of claim 13, wherein the saturation point for the magnetic shield element is in a range from 100 mT to 1 T.

20. The power receiver of claim 13, wherein the saturation point for the magnetic shield element is in a range from 200 mT to 400 mT.

* * * * *